(12) United States Patent
Kubo et al.

(10) Patent No.: US 7,961,586 B2
(45) Date of Patent: Jun. 14, 2011

(54) INFORMATION RECORDING/REPRODUCING DEVICE

(75) Inventors: Kohichi Kubo, Yokohama (JP); Takahiro Hirai, Yokohama (JP); Shinya Aoki, Yokohama (JP); Akihiro Koga, Tokyo (JP); Junichi Akiyama, Kawasaki (JP); Shinji Takakura, Yokohama (JP); Hiroaki Nakamura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 887 days.

(21) Appl. No.: 11/895,378

(22) Filed: Aug. 24, 2007

(65) Prior Publication Data

US 2008/0068743 A1 Mar. 20, 2008

(30) Foreign Application Priority Data

Aug. 31, 2006 (JP) ................... 2006-236741

(51) Int. Cl.
*G11B 9/00* (2006.01)
(52) U.S. Cl. ........................................ 369/126
(58) Field of Classification Search ............. 365/489.05; 369/126
See application file for complete search history.

(56) References Cited

U.S. PATENT DOCUMENTS

| | | | | |
|---|---|---|---|---|
| 5,574,279 A | * | 11/1996 | Ikeda et al. | 850/56 |
| 5,587,850 A | * | 12/1996 | Ton-that | 360/77.08 |
| 2002/0067683 A1 | * | 6/2002 | Iverson et al. | 369/126 |
| 2003/0218960 A1 | | 11/2003 | Albrecht et al. | 369/126 |
| 2005/0099713 A1 | * | 5/2005 | Molstad et al. | 360/48 |
| 2006/0017020 A1 | * | 1/2006 | Usa et al. | 250/492.23 |
| 2007/0133358 A1 | * | 6/2007 | Kubo et al. | 369/13.38 |
| 2008/0231986 A1 | * | 9/2008 | Aoki et al. | 360/75 |

FOREIGN PATENT DOCUMENTS

| | | | |
|---|---|---|---|
| EP | 471314 A1 | * | 2/1992 |
| JP | 2003-346392 | | 12/2003 |
| JP | 2004185756 | | 7/2004 |
| JP | 2004234707 | | 8/2004 |

OTHER PUBLICATIONS

Office Action from corresponding KR 10-2007-87627 dated Dec. 3, 2008 (with English translation).
Gotoh, et al., "*Minimal Phase-Change Marks Produced in Amorphous $Ge_2Sb_2Te_5$ Films*", Japanese Journal of Applied Physics, vol. 43, No. 6B, 2004, pp. L818-L-821.

(Continued)

*Primary Examiner* — Craig A. Renner
*Assistant Examiner* — Aneeta Yodichkas
(74) *Attorney, Agent, or Firm* — Ohlandt, Greeley, Ruggiero & Perle, L.L.P.

(57) ABSTRACT

An information recording/reproducing device according to an example of the present invention includes first and second heads, a recording medium having a data area from which recording data is read by the first head and a servo burst area from which a servo burst signal is read by the second head, a driver which performs positioning of the second head based on the servo burst signal, and a resistor which covers a surface of the servo burst area and does not cover a surface of the data area. The recording data and the servo burst signal are recorded by a pulse signal.

19 Claims, 8 Drawing Sheets

OTHER PUBLICATIONS

Sawa, et al., *"Hysteretc current-voltage characteristics and resistance switching at a rectifying Ti/$Pro_{0.7}$ $Ca_{0.3}MnO_3$ interface"*, Applied Physics Letters, vol. 85, No. 18, pp. 4073-4075, Nov. 1, 2004.

Vettiger, et al., *"The 'Milipede'—Nanotechnology Entering Data Storage"*, IEEE Transactions on Nanotechnology, vol. 1, No. 1, Mar. 2002, pp. 39-55.

Vettiger, et al., *"Thousands of Microcantilevers for Highly Parallel and Ultra-dense Data Storage"*, IEEE, 2003, pp. 32.1.1-32.1.4.

Onoe, et al., *"Nano-sized domain inversion characteristics in $LiNbO_3$ group single crystals using SNDM"*, Materials Science and Engineering B 120, 2005, pp. 130-133.

Office Action corresponding to Japanese Patent Application No. 2006-236741 dated Sep. 16, 2008.

\* cited by examiner

INFORMATION RECORDING/REPRODUCING DEVICE

CROSS-REFERENCE TO RELATED APPLICATIONS

This application is based upon and claims the benefit of priority from prior Japanese Patent Application No. 2006-236741, filed Aug. 31, 2006, the entire contents of which are incorporated herein by reference.

BACKGROUND OF THE INVENTION

1. Field of the Invention

The present invention relates to an information recording/reproducing device.

2. Description of the Related Art

In recent years, small portable apparatuses have spread worldwide, and simultaneously, demands of the nonvolatile memory with small size and large capacity expand rapidly with extensive progress of a high-speed information transmission network. Above all, in particular, NAND-type flash memories and small-size hard disk drives (HDDs) have evolved in rapid recording densities, resulting in forming great markets.

However, it is pointed out that both the NAND-type flash memories and small-size HDDs will reach the limit of recording density soon. With respect to the NAND-type flash memory, a processing cost is increased by a reduction of the minimum width of a conductive line. And with respect to the small-size HDD, it is not possible to sufficiently reserve tracking accuracy.

Under this situation, some ideas of new memories are provided to exceed the limit of the recording density.

For instance, phase-change RAM (PRAM) uses a material as a recording material capable of taking two states of an amorphous state (on) and a crystalline state (off) to adopt the principle in which these two states correspond to binary 0 and 1 in order to record data.

Concerning the writing/erasing, for instance, the amorphous state is formed by applying a large electric power pulse to the recording material, while the crystalline state is formed by applying a small electric power pulse to the recording material.

The reading is performed by measuring an electrical resistance of the recording material while causing a small read current to flow into the recording material, the read current being too small to cause the writing/erasing. The resistance of the recording material in the amorphous state is larger than the resistance of the recording material in the crystalline state, and its difference is about $10^3$.

The maximum feature of the PRAM lies in that the PRAM can operate even though the element size is reduced to about 10 nm. In this case, since the recording density of approximately 10 Tera bit per square inch (Tbpsi) can be realized, so that the PRAM is one of candidates for high-density recording (for instance, refer to T. Gotoh, K. Sugawara and K. Tanaka, Jpn. J. Appl. Phys., 43, 6B, 2004, L818).

Further, there has been reported a new memory, different from PRAM, having an operation principle which is very similar to that of the PRAM (for instance, refer to A. Sawa, T. Fuji, M. Kawasaki and Y. Tokura, Appl. Phys. Lett., 85, 18, 4073 (2004)).

According to the report, a typical embodiment of the recording material for recording the data is nickel oxide, and the large electric power pulse and the small electric power pulse are used for the writing/erasing like the PRAM. In this case, there is reported an advantage that the power consumption decreases at the time of the writing/erasing compared with the PRAM.

Until now, an operation mechanism of the new memory has not yet been found, but reproducibility is confirmed, and thus it is another candidate for high-density recording. Further, some groups try to elucidate the operation mechanism.

In addition to this, there is proposed a MEMS memory using micro-electromechanical system (MEMS) technology (for instance, refer to P. Vettiger, G. Cross, M. Despont, U. Drechsler, U. During, B. Gotsmann, W. Haberle, M. A. Lants, H. E. Rothuizen, R. Stutz and G. K. Binnig, IEEE Trans. Nanotechnology 1, 39 [2002]).

In particular, in the MEMS memory having a structure in which a plurality of array shaped cantilevers are confronted with the recording medium to which an organic material is applied, a probe at a distal end of the cantilever comes into contact with the recording medium with a proper pressure.

The writing is performed by controlling temperature of a heater added to the probe selectively. That is, when raising the temperature of the heater, the recording medium is softened, the probe is sunk into the recording medium, and thus depression is formed on the recording medium.

The reading is performed by scanning the probe with respect to the surface of the recording medium while causing a current to flow through the probe, the current being too small to soften the recording medium. When the probe is fallen into the depression of the recording medium, the temperature of the probe decreases, so that the resistance of the heater rises. As a result, it is possible to sense the data by reading the change of resistance.

The maximum feature of such a MEMS memory lies in that it is possible to dramatically improve the recording density because it is not necessary to provide a wiring in each recording part for recording the bit data. At the present state, the recording density of about 1 Tbpsi has been already achieved (for instance, refer to P. Vettiger, T. Albrecht, M. Despont, U. Drechsler, U. During, B. Gotsmann, D. Jubin, W. Haberle, M. A. Lants, H. E. Rothuizen, R. Stutz, D. Wiesmann and G. K. Binnig, P. Bachtold, G. Cherubini, C. Hagleitner, T. Loeliger, A. Pantazi, H. Pozidis and E. Eleftheriou, in Technical Digest, IEDM03 pp. 763-766).

Further, recently, approaches of achieving large improvement of the power consumption, the recording density and the working speed are performed while combining MEMS technology and new recording principle.

For instance, proposed is a system in which there is provided a ferroelectric layer on the recording medium, and the recording of the data is performed by causing dielectric polarization in the ferroelectric layer by applying a voltage to the recording medium. According to the system, there is theoretical prediction that it is possible to approach intervals (recording minimum unit) between the recording portions for recording the bit data to unit cell level of the crystal.

If the recording minimum unit becomes one unit cell of the crystal of the ferroelectric layer, the recording density becomes a very large value of about 4 Peta bit per square inch (Pbpsi).

However, such a ferroelectric recording MEMS memory has not been realized yet although its principle has been conventionally known.

The largest reason is that an electric field radiated from the recording medium is shielded by an ion in air. That is, since the electric field from the recording medium can not be detected, it is not possible to perform reading.

Further, another reason is that, when lattice defect exists in the crystal, electric charges are shielded such that electric charges caused by the lattice defect move to the recording part.

The former problem of the electric field shielding caused by the ion in air has been resolved by a proposal of the read system using a scanning nonlinear dielectric microscope (SNDM) recently, and thus the new memory has made a great progress toward the practical use (for instance, refer to A. Onoue, S. Hashimoto, Y. Chu, Mat. Sci. Eng. B120, 130 [2005]).

BRIEF SUMMARY OF THE INVENTION

An information recording/reproducing device according to an aspect of the present invention is provided with first and second heads, a recording medium having a data area from which recording data is read by the first head and a servo burst area from which a servo burst signal is read by the second head, a driver which performs positioning of the second head based on the servo burst signal, and a resistor which covers a surface of the servo burst area and does not cover a surface of the data area, wherein the recording data and the servo burst signal are recorded by a pulse signal.

DETAILED DESCRIPTION OF THE INVENTION

Figure 1:
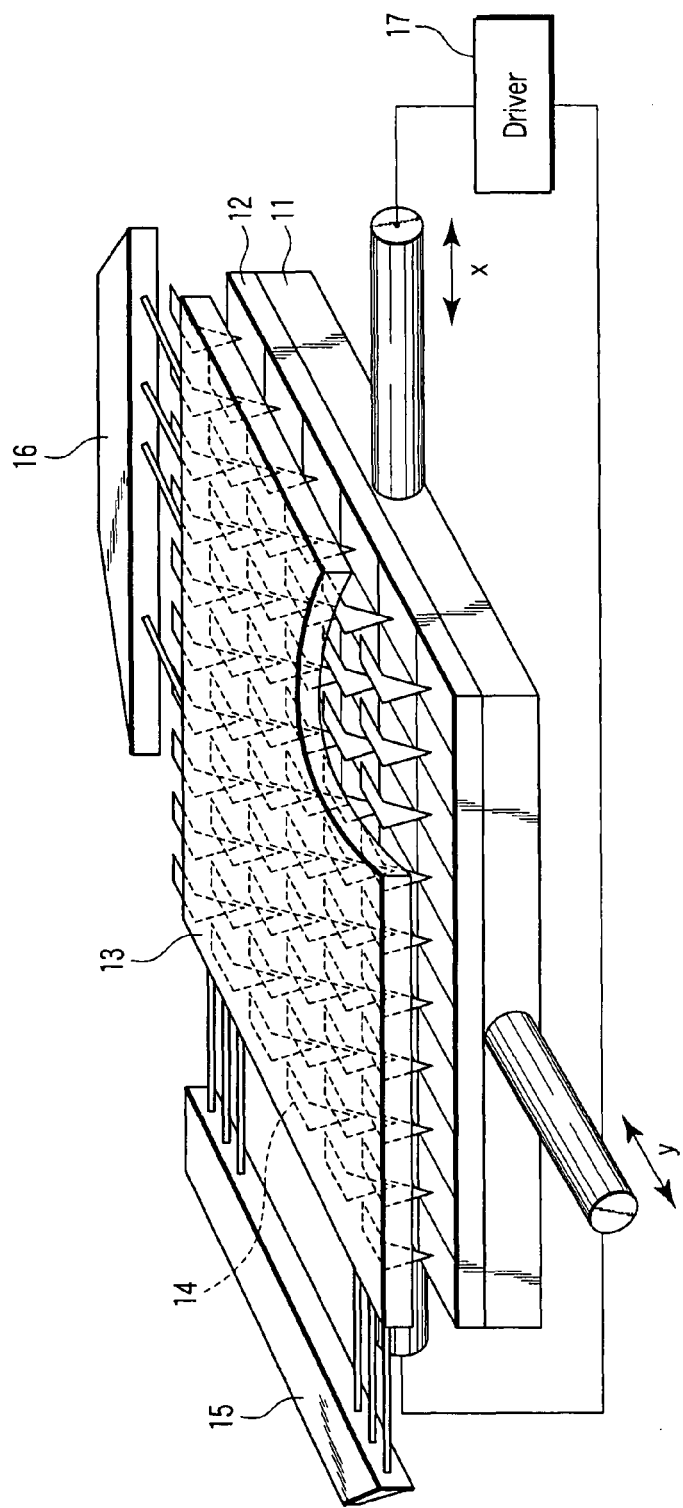
FIG. 1 is a perspective view showing an outline of an information recording/reproducing device according to an example.

An information recording/reproducing device of an aspect of the present invention will be described below in detail with reference to the accompanying drawings.

1. Outline

An example of the present invention relates to an information recording/reproducing device whose recording principles exist in the electrical resistance change of a recording medium and in which recording, reproduction and erasing of the data to the recording medium are performed using a head, and its characteristic lies in that a resistor which covers a surface of a servo burst area recording servo burst signals but does not cover a surface of a data area is newly added.

Since this resistor has a function of smoothly changing a resistance between the head and the recording bits in accordance with a distance (position deviation) therebetween, it becomes possible to perform highly accurate position control by utilizing, for instance, 4-phase lattice shape servo burst pattern.

Further, by optimizing a specific resistance of the resistor, it is possible to optimize a current caused to flow through the recording medium at the time of recording, reproduction and erasing of the data.

Concerning the specific resistance of the resistor, it is preferable that the specific resistance is, for instance, one digit smaller than the maximum specific resistance of the recording bits in the recording medium.

This is because, when the specific resistance of the resistor is too large, the servo burst signal is hard to detect caused by its resistance component.

In this manner, an electron discharged from the head reaches the recording bits in the recording medium via the resistor.

That is, when the head does not exist just above the recording bits, a distance in which the electron moves in the resistor is long, so that the resistance becomes large. When the head exists just above the recording bits, a distance in which the electron moves in the resistor is short, so that the resistance becomes small.

Incidentally, as a major candidate of the resistor, there are DLC (diamond-like-carbon) to which boron (B), nitrogen (N) or phosphorus (P) is doped, Si (silicon) or SiC (silicon carbide) to which boron, nitrogen or phosphorus is doped, a conductive oxide, a conductive nitride, and the like.

However, it is preferable for these resistors to be a covalent crystal material or an ionic crystal not including a bivalent nor lower valency ion so as not to cause a phase change by a voltage applied to the recording medium at the time of the data recording, the data reproducing and the data erasing.

Here, even though there is provided the resistor, difference between the maximum resistance of the recording bits and the minimum resistance thereof can be reserved sufficiently. Therefore, for instance, it is also possible to record one servo burst signal in common to a plurality of data tracks.

That is, it is possible to decrease a read error of the servo burst signal resulting from variation of size of the recording bits such that the size of the recording bits of the servo burst signal remains the same as the size of the recording bits (data bits) in the data area and the recording bits of the servo burst signal are thinned out regularly.

2. Embodiment

(1) MEMS Memory

There will be described about the MEMS memory to which an example of the present invention can be applied.

FIG. 1 shows an outline of the MEMS memory.

A recording medium 12 is arranged on an XY scanner 11. A probe array is arranged while facing the recording medium.

The probe array has a semiconductor substrate 13 and a plurality of probes (head) 14 arranged in an array shape at one surface side of the semiconductor substrate 13. Each of the plurality of probes 14, for instance, is comprised a cantilever, and driven by multiplex drivers 15, 16.

Although the plurality of probes 14 are operable individually by using a micro actuator in the semiconductor substrate 13, there will be described an example in which all of the probes in a batch perform an access to data area of the recording medium with the same operation.

Firstly, all of the probes 14 are caused to perform reciprocating operation with a fixed period in X direction while using the multiplex drivers 15, 16 to read position information in Y direction from the recording medium 12. The position information in the Y direction is transferred to the XY scanner 11.

The XY scanner 11 performs the positioning between the recording medium 12 and the probe 14 while moving the recording medium 12 in the Y direction based on the position information.

When the positioning of the both is completed, recording and reproducing of the data are performed simultaneously and continuously to all the probes 14 on the data area.

The recording and the reproduction of the data are performed continuously due to the fact that the probe 14 performs the reciprocating motion in the X direction. Further, the recording and the reproduction of the data are sequentially executed every one row to the data area by changing position of the recording medium 12 in the Y direction.

Note that it is also preferable that the probe 14 moves in the Y direction, after reading the position information from the recording medium 12 while performing the reciprocating motion of the recording medium 12 with a fixed period in the X direction.

Figure 2:
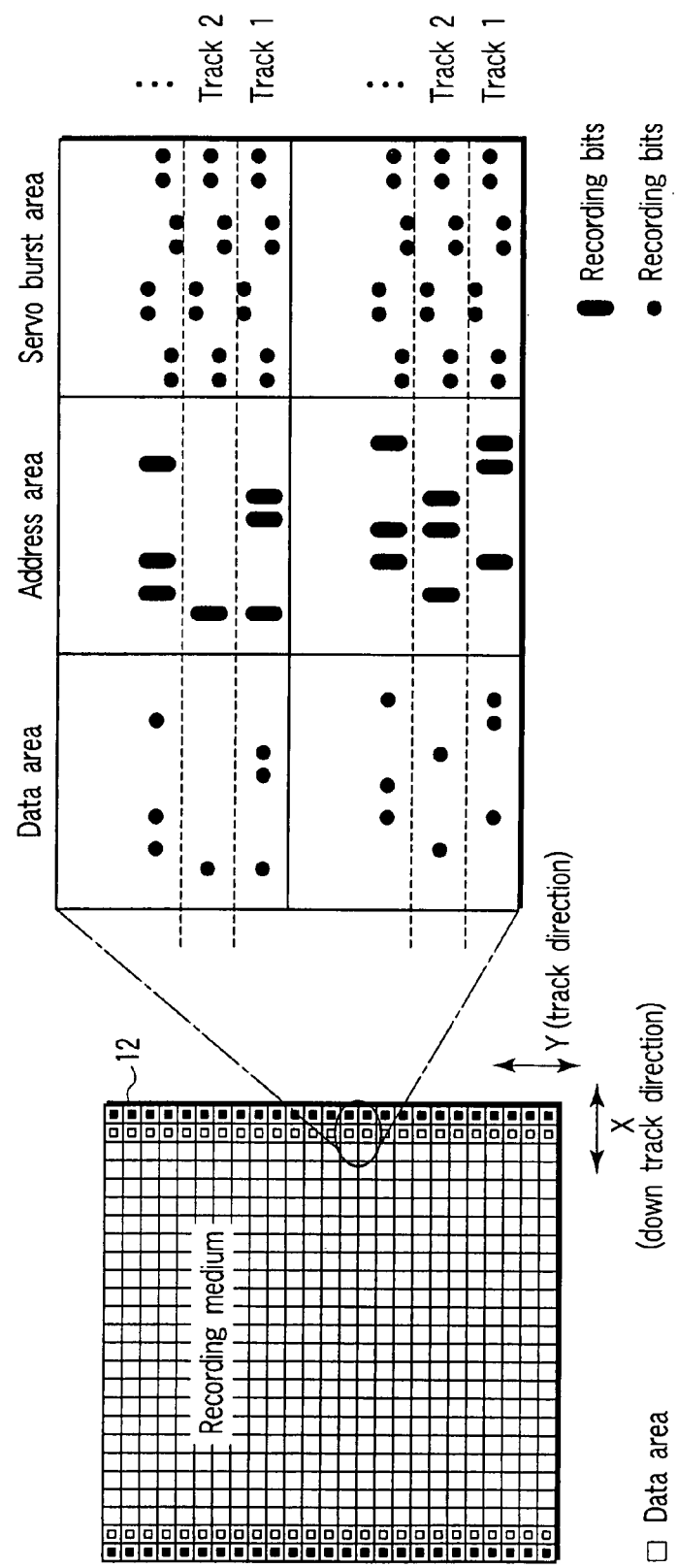
FIG. 2 is a plan view showing a recording medium.

FIG. 2 shows an outline of the recording medium.

The recording medium 12 is comprised a plurality of data areas, an address area and a servo burst area, the address area and the servo burst area being arranged at both ends in the direction of the plurality of data areas. A main part of the recording medium 12 is a plurality of data areas.

Address signals are recorded in the address area, while servo burst signals are recorded in the servo burst area. Both signals show the position information in the Y direction in the data area. That is, the address signal shows rough position information (range), while the servo burst signal specifies a center position in the range.

Further, a preamble area for synchronization may be provided in the recording medium in addition to this information.

The data, the address signal and the servo burst signal are recorded in the recording medium as the recording bits (electrical resistance change). The binary data of the recording bits is read upon detecting the electrical resistance of the recording medium.

One probe (head) is provided corresponding to one data area of the recording medium 12. In the present example, the sizes of the address area and the servo burst area are made the same as the size of the data area. In this case, one probe is provided to one address area, and one probe is provided to one servo burst area.

The data area is comprised a plurality of tracks. The track of the data area is specified by the address signal read from the address area.

Further, the servo burst signal read from the servo burst area is for moving the probe 14 to the center of the track to eliminate read error of the recording bits.

Here, it becomes possible to utilize a head position control technique of the HDD in such a way that the X direction corresponds to a down track direction, while the Y direction corresponds to a track direction.

For instance, as shown in FIG. 2, 4-phase lattice shape servo burst pattern is recorded in the servo burst area, and it is possible to perform the position control between the recording medium and the probe. In this case, the servo burst signal changes with a fixed period in accordance with the position in the track direction of the recording medium with which the probe comes into contact.

In the example of FIG. 2, its period corresponds to width of one data track.

Figure 3:
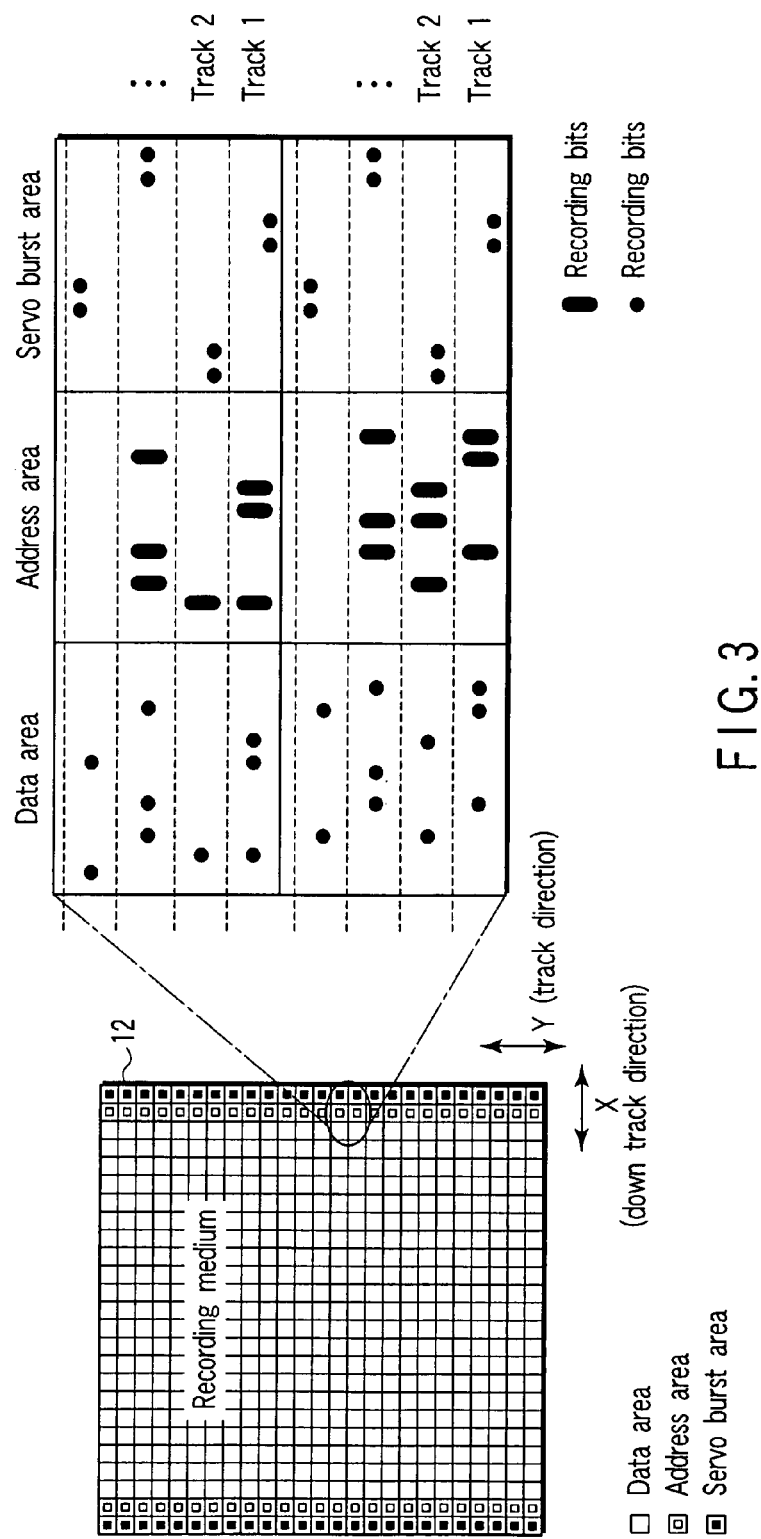
FIG. 3 is a plan view showing a recording medium.

Further, as shown in FIG. 3, it is possible to decrease read errors of the servo burst signal resulting from variation of size of the recording bits such that the size of the recording bits of the servo burst signal remains the same as the size of the data bits and the recording bits of the servo burst signal are thinned out regularly.

In this case, the period of the servo burst signal becomes larger than width of one data track. In the example of FIG. 3, the period of the servo burst signal corresponds to width of a plurality of data tracks.

Figure 4:
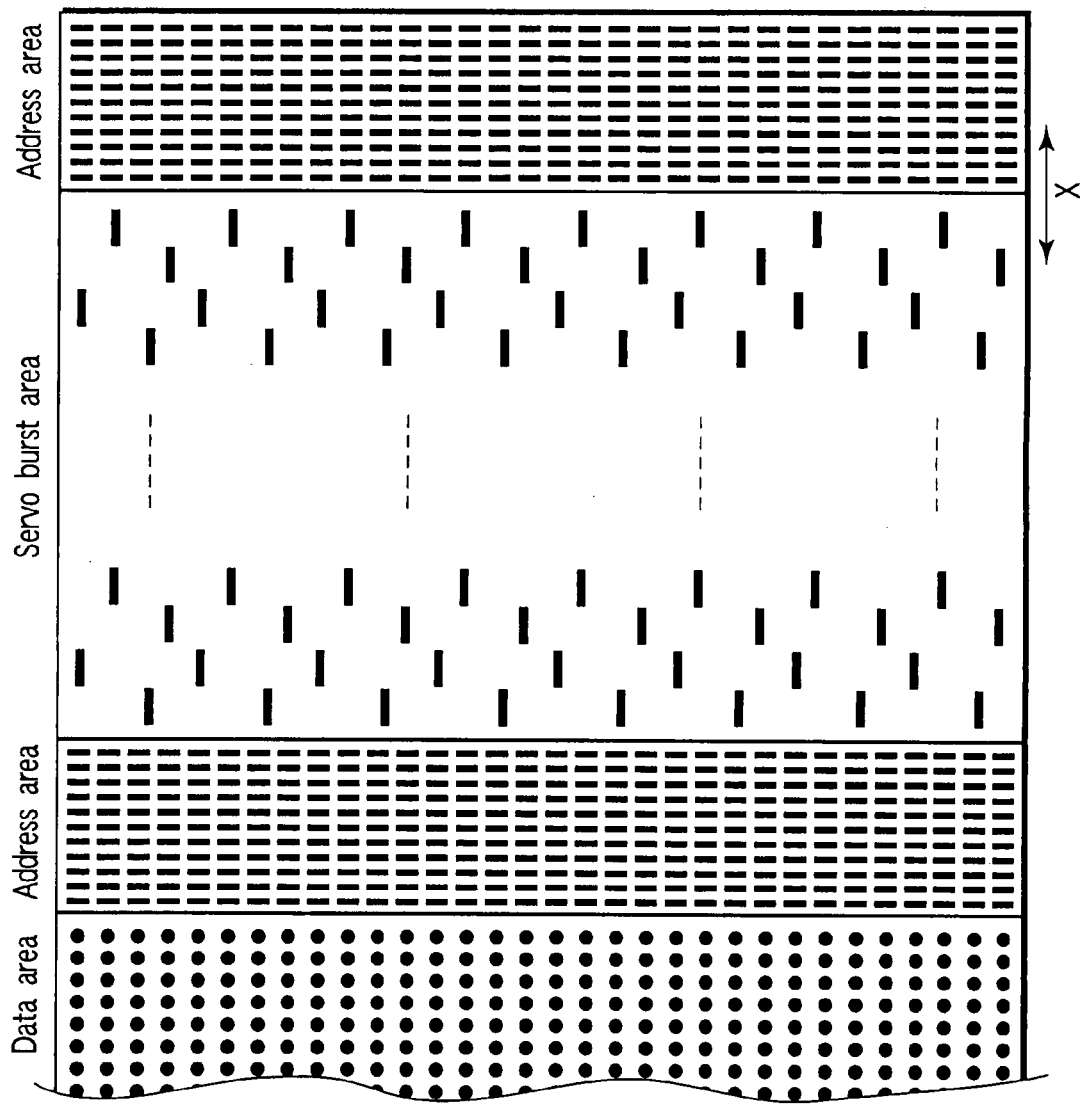
FIG. 4 is a plan view showing a recording medium.

Note that, concerning the address area and the servo burst area, for instance, as shown in FIG. 4, it is preferable that the data may be read using one probe to the address area and the servo burst area at one end side of the recording medium in common, while making the total size of the address area and the servo burst area the same size as the data area.

In the example of FIG. 4, the address area is arranged in such a shape as to sandwich the servo burst area. One probe is caused to perform a reciprocating motion with a sampling frequency (e.g., 10 kHz) in one data track in the X direction to read the address data and the servo burst signal continuously. A scan frequency for reading the data bits is set to, for instance, a value (e.g., 1 kHz) lower than the sampling frequency.

The period of the servo burst signal is to be width corresponding to a plurality of data tracks to make the read error of the servo burst signal small.

However, when making the period of the servo burst signal extremely large, ratio of the resistance change to the position in the track direction becomes small, and thus position detection becomes difficult. Therefore, it is preferable that its period may be made not more than width corresponding to 20 data tracks.

Note that, when reading the position information from the servo burst area, it is preferable that signal intensity is changed smoothly in accordance with a distance (deviation) between the probe and the recording bits.

However, in the probe memory using such a resistance change principal, resistance change amount of the recording bits reaches $10^4$ to $10^6$. Therefore, change of the signal intensity to the distance (deviation) between the probe and the recording bits becomes extremely steep.

Therefore, even when the position of the probe is deviated from just above the recording bits only slightly, it becomes almost impossible to detect any signal, so that it becomes difficult to perform position control between the probe and the recording medium.

(2) Basic Principle

There will be described a basic principle of the present invention with an information recording/reproducing device of FIGS. 1 to 4 as an example.

Figure 5:
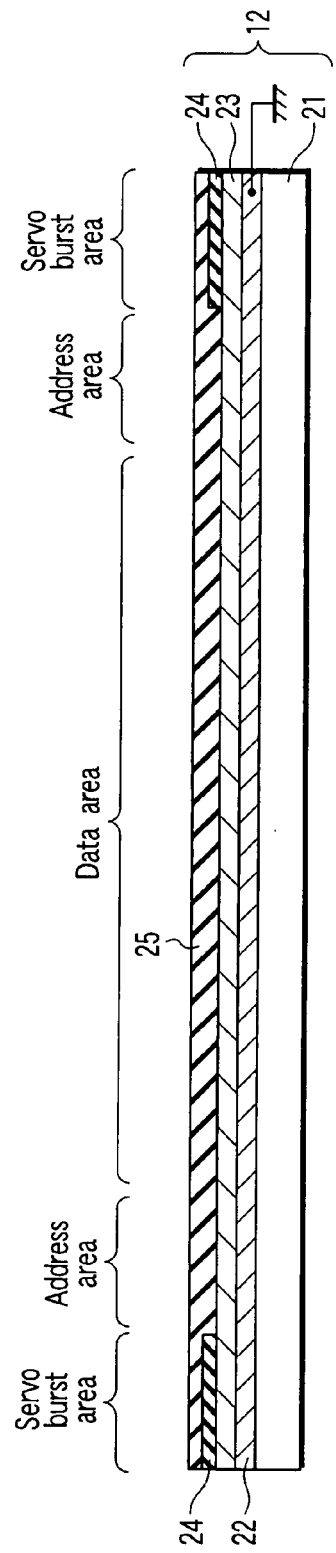
FIG. 5 is a cross-sectional view showing a structure of a recording medium.

The probe 14 as the recording/reproducing/erasing head is an electron generating source or a hot electron generating source, having a pointed forward end part. The recording medium 12 is comprised, for instance, as shown in FIG. 5, a substrate 21, an electrode layer 22 on the substrate 21, a recording layer 23 on the electrode layer 22, and a surface protective layer 25 on the recording layer 23.

Further, a resistor 24 is arranged between the recording layer 23 and the surface protective layer 25 in the servo burst area. That is, the servo burst area is covered by the resistor 24, while areas other than the servo burst area are not covered by the resistor 24.

Note that, since the servo burst area is covered by the resistor 24, the surface protective layer 25 in the servo burst area may be eliminated while making the resistor 24 possess a function as the surface protective layer.

The ground potential is applied to the electrode layer 22.

When recording the data to the recording layer 23, a pulse current is caused to flow from the probe 14 to the recording medium 12, part (recording bits) of the recording layer 23 is subjected to phase change, and its resistance is caused to change. Reproduction the data is performed by reading the resistance while causing minute current to flow into the recording bits, the current being too small to cause the phase change in the recording layer 23.

When erasing (resetting) the data of the recording layer 23, the recording bits are returned to initial state while causing a pulse current, larger than the pulse current at the time of recording, to flow to the recording medium 12 from the probe 14.

In the information recording/reproducing device shown in FIG. 1, a large number of probes 14 aligned in an XY-plane constitute a probe array.

Relative positions of the recording medium 12 and the probe 14 can be changed freely in the XY-plane. As described already, at the time of the data reproduction, for instance, the recording medium 12 always remains the state of performing reciprocating motion with a fixed period in the X direction to the probe 14, while the position of the probe 14 is caused to move in the Y direction every one row.

The data reproduction is performed simultaneously in connection with all probes arranged on the recording medium 12. At this time, it becomes important in performing accurate reproduction that minute position deviation of Y-coordinate between the recording medium 12 and the probe 14 is detected and the deviation is corrected. For this reason, a servo pattern for position correction is recorded in the recording medium 12.

The servo pattern is each recorded in a left end servo burst area and a right end servo burst area of the recording medium 12. Further, in order to read the servo pattern, the probes 14 arranged at the left end and the right end of the probe array respectively are used.

Here, the servo burst area is covered by the resistor 24. Therefore, even though resistance change amount of the recording bits is large, the signal intensity with respect to the distance (deviation) between the probe and the recording bits changes continuously and gradually.

Therefore, since it is possible to correct the minute position deviation of the Y-coordinate between the recording medium 12 and the probe 14 with a high degree of accuracy, it is possible to realize the position control easily and inexpensively in order to realize a high recording density exceeding 10 Tera bit per square inch (Tbpsi).

Note that it is preferable for the position control with a high degree of accuracy that thickness of the resistor 24 is smaller than a pitch of the recording bits in the track direction of the recording medium 12. This is for preventing the resistance of the resistor 24 from becoming extremely larger than the resistance of the recording bits.

(3) Experiment Example

Figure 6:
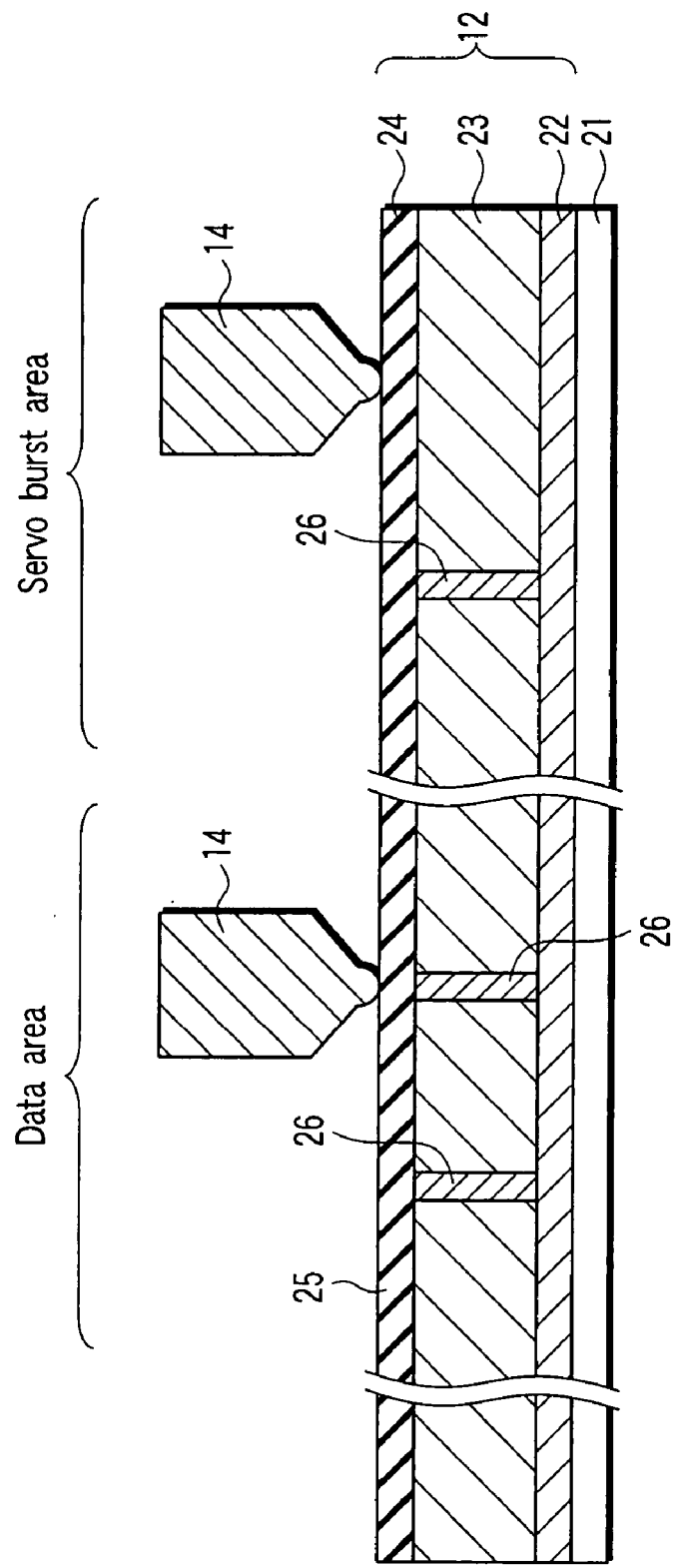
FIG. 6 is a view showing a state at the time of recording.

FIG. 6 shows an information recording/reproducing device according to an example of the present invention.

The pitch of the probe array, when supposing that all the probes 14 are aligned with a fixed pitch in the X direction, is set to about 10 μm. At this time, the recording medium 12 performs reciprocating motion in the X direction with a frequency of about 1 kHz, and an amplitude of about 10 μm.

In the data area, the resistance (data) of the recording bits 26 is read by the probe 14, and at the same time, in the servo burst area, the servo burst signal is read by the probe 14, and position correction of the probe 14 in the Y direction is executed.

The recording medium 12 is formed by the following manufacturing method.

As the substrate 21, for instance, a silicon substrate with a vertical size of about 100 mm, a lateral size of about 100 mm, and a thickness of about 1 mm is used.

The electrode layer 22 made of platinum (Pt) with a thickness of about 500 nm is formed on the substrate 21. Continuously, with a substrate temperature of about 300° C. to 600° C., and in atmosphere of argon (Ar) 95% and oxygen (O) 5%, the recording layer 23 made of $ZnMn_2O_4$ with a thickness of about 10 nm is formed on the electrode layer 22.

Formation of the recording layer 23 is executed by RF magnetron sputtering which uses a target adjusted such that its composition results in $ZnMn_2O_4$.

After that, the surface protective layer 25 comprised, for instance, diamond-like carbon (DLC) is formed on the recording layer 23 in the data area, and the resistor 24 having the specific resistance smaller than the maximum specific resistance of the recording bits 26 of the recording layer 23 is formed on the recording layer 23 in the servo burst area.

It is preferable for the resistor 24 to use material having the small specific resistance by one digit to four digits compared with the maximum specific resistance of the recording bits 26, such as for instance, boron-doped diamond-like carbon.

The resistor 24 and the surface protective layer 25 are formed by the CVD method so as to obtain approximately 3 nm thickness each.

The recording medium 12 is completed by the above mentioned process.

There will be described evaluation of positioning accuracy.

Here, a probe-pair in which diameter of the pointed end is not more than 10 nm is used. Distance between the pointed ends of the two probes is changeable.

The recording of the data (recording bits) is performed by applying a pulse voltage of approximately 1V having a width of approximately 10 nsec to the servo burst area of the recording medium 12 while using one of the probe-pair. Further, after recording, the resistance of the previously recorded data is read by applying a pulse voltage of approximately 0.1V having a width of approximately 10 nsec to the servo burst area of the recording medium 12 while using the other one of the probe-pair.

Distance between the two pointed ends of the probes corresponds to deviation between the recording bits and the probe at the time of reproduction.

Figure 7:
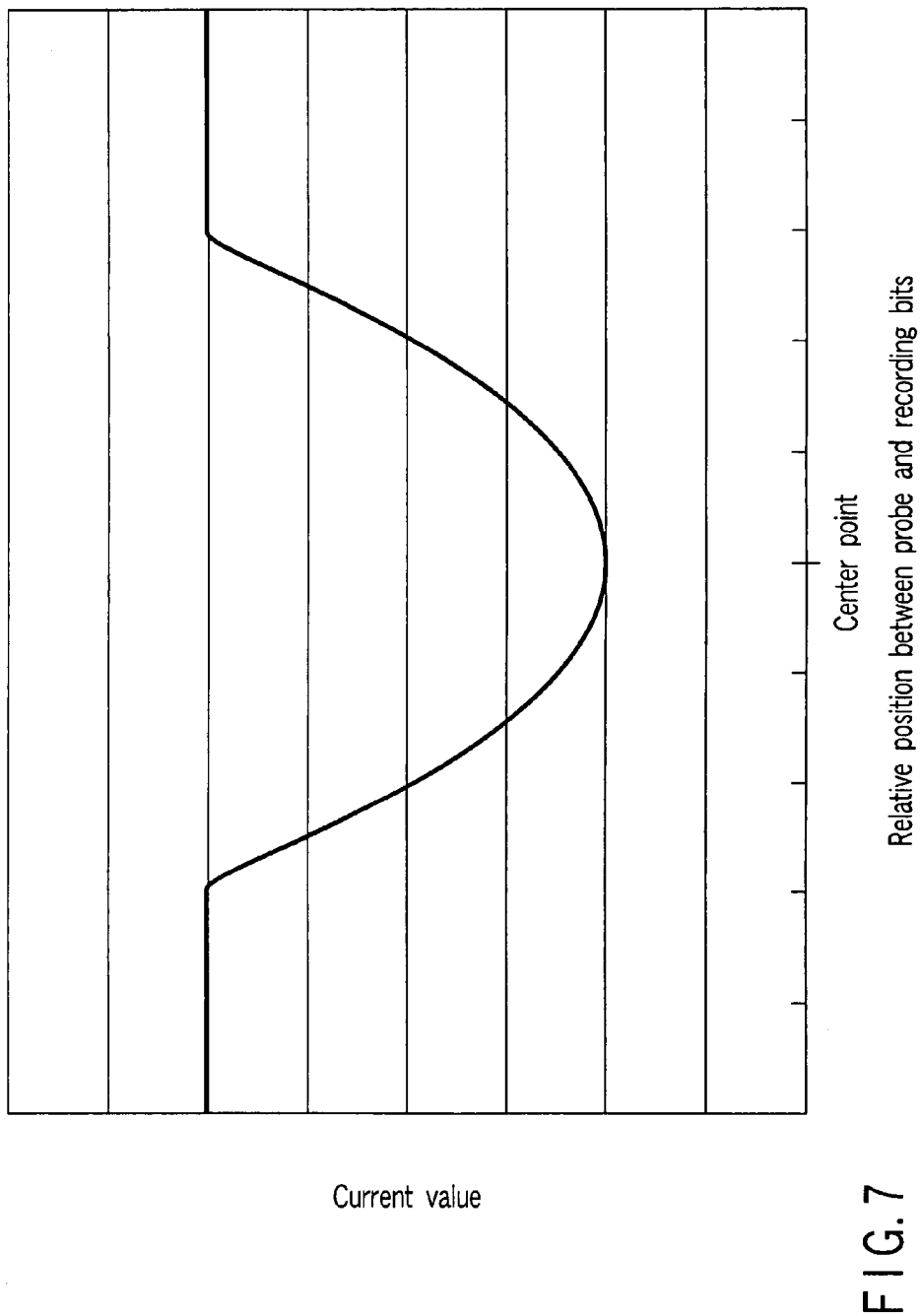
FIG. 7 is a view showing a relationship between relative position of a probe and recording bits, and resistance.

As a result, as shown in FIG. 7, it is confirmed that a current detected by the other one of the probe-pair changes gradually in accordance with the distance between the two pointed ends of the probes, that is, in accordance with the distance between the recording bits and the probe (for reproduction).

That is, it becomes possible to perform positioning with a high degree of accuracy by recording the servo pattern in the servo burst area.

On the contrary, the same evaluation is performed in the data area.

Since the resistor 24 according to the example of the present invention is not formed in the data area, its evaluation is the evaluation of the data area and is the evaluation of the conventional servo burst area having no resistor 24.

Figure 8:
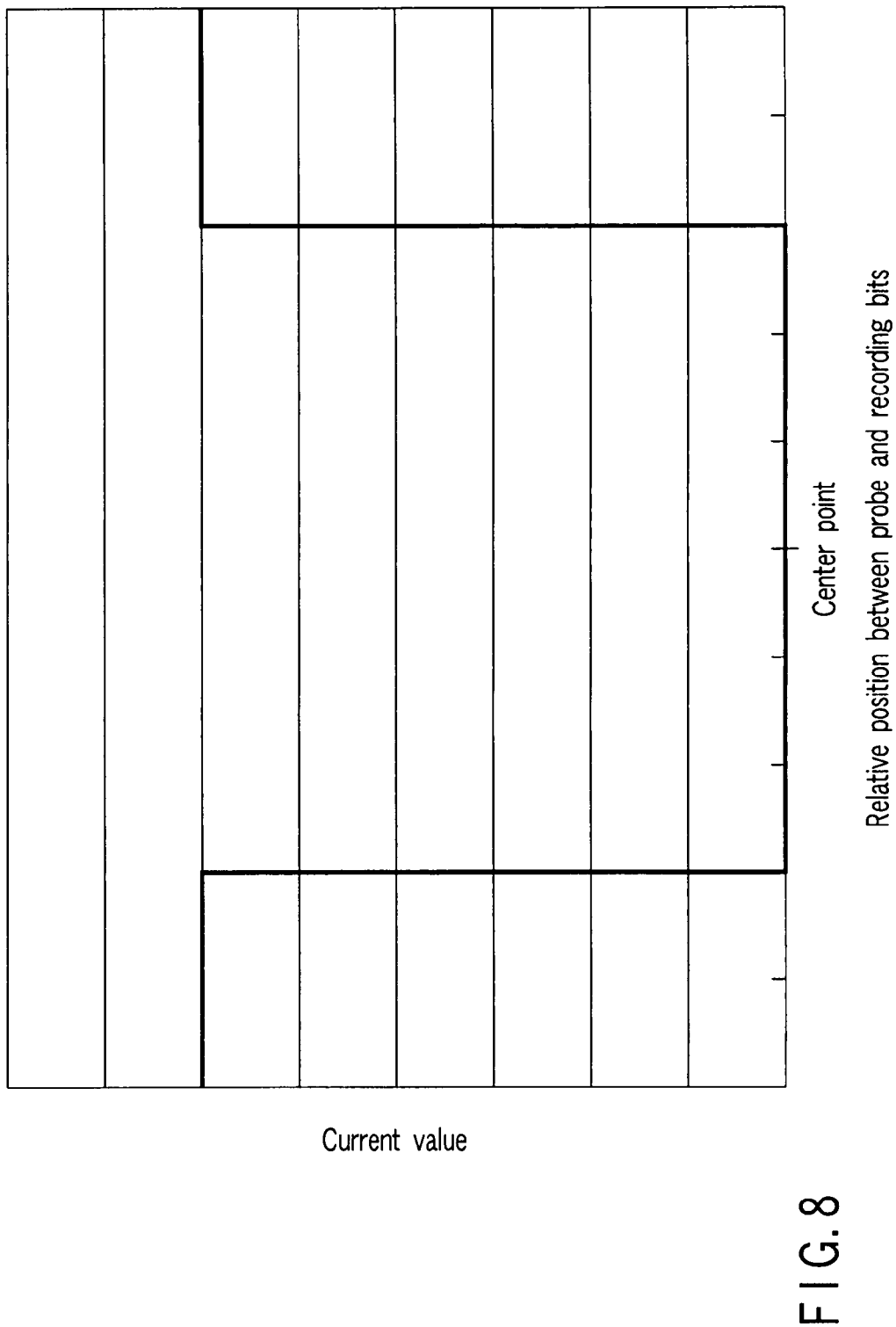
FIG. 8 is a view showing a relationship between relative position of a probe and recording bits, and resistance.

As a result, as shown in FIG. 8, it is confirmed that a current detected by the other one of the probe-pair changes steeply in accordance with the distance between two pointed ends of the probes, that is, in accordance with the distance between the recording bits and the probe (for reproduction).

This means that since difference of the resistances of before/after recording of the recording medium 12 is extremely large, the current hardly flows at a part other than a recorded part (recording bits). That is, the signal can be detected only at a part just above the recording bits. Therefore, in the case where the detected signal is defined as the servo burst signal, it is not possible to perform the positioning with a high degree of accuracy.

Note that, since the data bits are read after positioning, it is preferable that the data area is not covered by the resistor.

(4) Others

The example of the present invention can be applied to a general information recording/reproducing device whose recording principle exists in electrical resistance change of the recording medium, in which data recording, data reproduction and data erasing to the recording medium is performed using the head (for instance, probe).

In particular, the example of the present invention is effective for the MEMS memory in which a plurality of heads with an array shape are arranged on the recording medium.

3. Conclusion

According to the example of the present invention, it is possible to realize the information recording/reproducing device with a high degree of recording density by the highly accurate position control technique.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording/reproducing device comprising:
    first and second heads;
    a recording medium having a data area from which recording data is read by the first head, and a servo burst area from which a servo burst signal is read by the second head;
    a driver which performs positioning between the first head and the recording medium based on the servo burst signal; and
    a resistor which covers a surface of the servo burst area and does not cover a surface of the data area,
    wherein the recording data and the servo burst signal are recorded by an electrical resistance change, and
    wherein a specific resistance of the resistor is smaller than a maximum specific resistance of the electrical resistance change.

2. The information recording/reproducing device according to claim 1, wherein the resistor is one of a diamond-like-carbon doped with boron, nitrogen or phosphorus, silicon or silicon carbide doped with boron, nitrogen or phosphorus, a conductive oxide, and a conductive nitride.

3. The information recording/reproducing device according to claim 1, wherein the resistor is one of a covalent crystal and an ionic crystal not including a bivalent nor lower valency ion.

4. The information recording/reproducing device according to claim 1, wherein the data area and the servo burst area each extend in a first direction, and have tracks arranged in a second direction crossing at right angle to the first direction.

5. The information recording/reproducing device according to claim 4, wherein thickness of the resistor is smaller than a pitch in the second direction of recording bits in the servo burst area.

6. The information recording/reproducing device according to claim 4, wherein a pitch in the second direction of recording bits in the servo burst area is larger than a pitch of the tracks.

7. The information recording/reproducing device according to claim 4, wherein a period of the servo bust signal is longer than a pitch of the tracks.

8. The information recording/reproducing device according to claim 4, wherein the driver causes the first and second heads to perform reciprocating motion with a fixed period in the first direction.

9. The information recording/reproducing device according to claim 8, wherein the driver performs positioning between the first head and one of the tracks.

10. A recording medium comprising:
    a data area from which recording data is read by a first head;
    a servo burst area from which a servo burst signal is read by a second head; and
    a resistor which covers a surface of the servo burst area and does not cover a surface of the data area,
    wherein the recording data and the servo burst signal are recorded by an electrical resistance change, and a positioning of the first head is performed based on the servo burst signal, and
    wherein a specific resistance of the resistor is smaller than a maximum specific resistance of the electrical resistance change.

11. The recording medium according to claim 10, wherein the resistor is one of a diamond-like-carbon doped with boron, nitrogen or phosphorus, silicon doped with boron, nitrogen or phosphorus, a conductive oxide, and a conductive nitride.

12. The recording medium according to claim 10, wherein the resistor is one of a covalent crystal and an ionic crystal not including a bivalent nor lower valency ion.

13. The recording medium according to claim 10, wherein the data area and the servo burst area each extend in a first direction, and have tracks arranged in a second direction crossing at right angle to the first direction.

14. The recording medium according to claim 13, wherein thickness of the resistor is smaller than a pitch in the second direction of recording bits in the servo burst area.

15. The recording medium according to claim 13, wherein a pitch in the second direction of recording bits in the servo burst area is larger than a pitch of the tracks.

16. The recording medium according to claim 13, wherein a period of the servo bust signal is longer than a pitch of the tracks.

17. The recording medium according to claim 13, wherein the first and second heads perform reciprocating motion with a fixed period in the first direction.

18. The recording medium according to claim 17, wherein positioning of the first head is performed to one of the tracks.

19. An information recording/reproducing device comprising:
    first and second heads;
    a recording medium having a data area from which recording data is read by the first head, and a servo burst area from which a servo burst signal is read by the second head;
    a driver which performs positioning between the first head and the recording medium based on the servo burst signal; and
    a resistor which covers a surface of the servo burst area and does not cover a surface of the data area,
    wherein the recording data and the servo burst signal are recorded by an electrical resistance change, and
    wherein the resistor is one of a covalent crystal and an ionic crystal not including a bivalent nor lower valency ion.

* * * * *